(12) United States Patent
Kienzler

(10) Patent No.: US 10,259,359 B2
(45) Date of Patent: Apr. 16, 2019

(54) DEVICE FOR VENTILATING A VEHICLE SEAT AND VEHICLE SEAT

(71) Applicant: EBM-Papst St. Georgen GmbH & Co. KG, St. Georgen (DE)

(72) Inventor: Andreas Kienzler, St. Georgen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 0 days.

(21) Appl. No.: 15/519,947

(22) PCT Filed: Aug. 27, 2015

(86) PCT No.: PCT/EP2015/069664
§ 371 (c)(1),
(2) Date: Apr. 18, 2017

(87) PCT Pub. No.: WO2016/096170
PCT Pub. Date: Jun. 23, 2016

(65) Prior Publication Data
US 2018/0022251 A1     Jan. 25, 2018

(30) Foreign Application Priority Data
Dec. 18, 2014   (DE) .................. 10 2014 119 041

(51) Int. Cl.
*B60N 2/56* (2006.01)
(52) U.S. Cl.
CPC ........... *B60N 2/565* (2013.01); *B60N 2/5642* (2013.01); *B60N 2/5657* (2013.01); *B60N 2/5685* (2013.01)
(58) Field of Classification Search
CPC ..... B60N 2/565; B60N 2/5642; B60N 2/5657
(Continued)

(56) References Cited

U.S. PATENT DOCUMENTS

| 7,478,869 B2* | 1/2009 | Lazanja | B60N 2/5635 297/180.13 |
| 7,862,113 B2* | 1/2011 | Knoll | B60N 2/5635 297/180.13 |

(Continued)

FOREIGN PATENT DOCUMENTS

| DE | 198 51 649 C1 | 4/2000 | |
| DE | 10 2004 004 388 B3 | 5/2005 | |
| WO | WO-2014058429 A1 * | 4/2014 | ........... B60N 2/5628 |

OTHER PUBLICATIONS

International search report for Application No. PCT/EP2015/069664 dated Nov. 17, 2015.

*Primary Examiner* — Syed A Islam
(74) *Attorney, Agent, or Firm* — Bachman & LaPointe, PC

(57) ABSTRACT

A device for ventilating a vehicle seat, said device comprising: a cushion (12) which is elastic with respect to a user contact and which is designed to form a seating surface and/or a contact surface (24) for the back, said cushion having an air flow channel (16, 17) which forms an air outlet (15) in the direction of the seating surface and/or contact surface for the back; a cover unit (18) designed to at least partially cover the air outlet, the unit being air-permeable, rigid and preferably having a lattice-type construction; and a fan unit (14) which is associated with the air flow channel and which has an electric motor-driven fan rotor (30) and a fan housing (32), some sections of which housing radially surround the fan rotor. The cover unit and the fan unit are mutually spaced (d) along the air flow channel and preferably are secured to or in the cushion without a direct connection to sections of said cover unit and fan unit. Preferably, a mechanical connection between the cover unit and the fan unit is achieved only by a flexible, rubber-elastic (Continued)

material, especially preferably a foam-type material of the cushion (12).

20 Claims, 1 Drawing Sheet

(58) Field of Classification Search
USPC .......................... 297/180.1, 180.12, 180.14
See application file for complete search history.

(56) References Cited

U.S. PATENT DOCUMENTS

| | | |
|---|---|---|
| 2003/0132650 A1 | 7/2003 | Bargheer et al. |
| 2007/0176471 A1 | 8/2007 | Knoll |
| 2015/0274049 A1* | 10/2015 | Langensiepen ...... B60N 2/5628 297/180.12 |

* cited by examiner

DEVICE FOR VENTILATING A VEHICLE SEAT AND VEHICLE SEAT

BACKGROUND OF THE INVENTION

The present invention relates to a device for ventilating a vehicle seat. Furthermore, the present invention relates to a vehicle seat which has such a ventilation device of the type in question.

Seat ventilation devices are known in general from the prior art; while, for example in the field of higher value motor vehicles, known devices of the type in question for supplying air to users who are in contact with a seat and/or back contact surface in the operating state of a vehicle seat and are acted upon with air sucked up by the fan unit— customarily from the vehicle interior—and discharged through the seat and/or back contact surface increasingly prevail, the comfort- and safety-increasing use, for example, of a seat ventilation device of the described type has long been tried and tested in aircraft, in construction vehicles, agricultural vehicles or military vehicles, especially in particularly stressful operating environments.

Traditionally, for the purpose of supplying air to the seat and/or back contact surface, a cushion manufactured customarily from an elastic foam material suitable for the sitting purposes of the user is provided with a through duct as air flow duct in such a manner that the fan unit, which is customarily accommodated in a modular manner in a fan housing, sucks up the additional air through said duct and then discharges same on the outlet side to the seat and/or back contact surface, wherein said outlet is frequently provided with an air-permeable, rigid cover unit in a manner known from the prior art. Said cover unit primarily has the purpose of preventing an unintentional sinking in of a user in the event of a punctiform weight loading of the cushion— what is referred to as the "knee test", wherein, for this purpose, the cover unit, which is typically configured in the manner of a lattice, brings about a furthermore flat and fixed covering of the fan outlet at the end of the user-side end of the air flow duct.

In the case of devices presumed to be known from the prior art, said cover unit is typically designed as a termination or end-side delimitation of the fan housing, wherein, in particular from large scale manufacturing aspects and in order to realize the described modular concept, said assemblies can then be integrated, frequently also integrally, by suitable plastics injection molding technologies in order thereby to permit cost-effective manufacturability with easy installation properties, namely by simple insertion into the flow duct in the cushion.

A layer (which is flat and narrow relative to the cushion) of an air-permeable material which therefore conducts air along or parallel to the seat and/or back contact surface is frequently then also applied to the seat and/or back contact surface of the (foam) cushion, with the purpose of ensuring, for a top layer then stretched thereon (for example a seat leather layer suitably perforated for the air discharge), an air discharge which is distributed as far as possible over an area and is adapted to the anatomical user proportions of the seated user.

While specifically in the case of stressful environmental temperatures seat ventilation technologies of this type in the vehicle can significantly increase the user's travelling comfort and therefore passive operational safety of the vehicle equipped in this manner, the technology presumed to be known from the preamble and the generic type has nevertheless proven in need of improvement, in particular in respect of the special ventilation and installation conditions of a vehicle seat: an axial fan, which is customarily used within the scope of the fan unit forming the generic type, as the fan motor is dimensioned together with the further components of the air flow chain in such a manner that a delivery volume within the range of between approximately 4 liters/sec and approx. 10 liters/sec can be achieved, wherein typical seat contact surfaces of motor vehicles have a plurality of air flow ducts (spaced apart from one another and separated in terms of flow) together with respective fan units and cover units. As regards the dimensioning of the fan, including a diameter which can be realized for the fan rotor, the radial construction space is first of all restricted, for example by the problem described at the beginning that inhomogeneities in the (foam) cushion have a disadvantageous effect on the supporting properties of the cushion and the seat comfort, wherein even, for example, too large a diameter of the described cover unit could be potentially comfort-inhibiting (since it is itself rigid). Added to this is the problem that the plurality of mutually adjacent air flow ducts customarily to be provided in the same cushion have to have a sufficient minimum distance from one another in order to ensure a stable holding or anchoring of the fan units on or in the cushion.

In order, in view of these geometrical limits of the installation conditions in the vehicle seat and resultingly limited (radial) fan diameter, nevertheless to ensure a high air transport volume, it is customary to realize fan units, which are used for the seat ventilation, with high rotational speeds of the fan rotor; said fan units can reach up to 10 000 $min^{-1}$.

However, it has then proved disadvantageous within the scope of the invention that, during the operation of a fan rotor with such high revolution speeds, vibrations occur which can be transmitted to the user via the rigid cover unit and can significantly impair the seat comfort. It has namely turned out that rotational speeds within the range mentioned may cause a vibration excitation of the system consisting of cover unit and fan housing, with the disadvantageous effect that specifically excited resonant frequencies may lead here to considerable vibration effects and to the described losses of comfort. Added to this is the potentially annoying generation of noise and the potential risk of mechanical impairments of the fan motor, which drives the fan rotor, together with bearings in such resonant situations.

SUMMARY OF THE INVENTION

It is therefore the object of the present invention to improve a ventilation device for a vehicle seat according to the preamble of the main claim in respect of its operating and installation properties specifically in the case of constricted installation conditions, in particular limited radial diameters of usable fan units and fan rotors, with high air transport capacities required as before, and, in the process, in particular to prevent annoying and potentially harmful vibrations and/or to keep them away from the user and to create the conditions such that a comfortable ventilation device with a high degree of operational reliability can nevertheless be produced and mounted efficiently and in a manner suitable for large scale manufacturing.

The object is achieved by the device for ventilating a vehicle seat with the features disclosed herein; advantageous developments of the invention are also described herein. Additional protection within the scope of the invention is claimed for a vehicle seat which uses the ventilation device according to the invention. Within the scope of the invention, the term of the "vehicle" should be interpreted broadly and, in addition to customary land vehicles for private, commercial, agricultural and military purposes, in particular also includes aircraft and watercraft, and therefore the advantages according to the invention can be realized within a great breadth of suitable use contexts.

In a preferred manner according to the invention, the cover unit is provided spaced apart from the fan unit along the direction of the air flow duct, wherein said spacing is particularly preferably realized merely by the material of the cushion, namely typically a foam material (which is elastic in accordance with the padding purposes of the vehicle seat) without there being further mechanical connecting components between the cover unit and fan unit assemblies, wherein in particular said assemblies, for example in comparison to the prior art presumed to form the generic type, are not, for example, directly connected to one another at the respective portions.

The term "elastic" used according to the invention in respect of the cushion should be understood here as meaning that the vehicle-customary cushioning and spring-mounting effect for a seated user (in the case of a seat cushion) or reclining user (in the event of a back cushion) is therefore ensured; in particular, the cover unit should be regarded as rigid, according to the invention, in comparison to such an elastic cushion, namely with the primary effect that a material rigidity of the cover unit—configured particularly preferably and advantageously as a lattice—prevents the disadvantageous effect described at the beginning of a user sinking in in the event of a punctiform weight loading in the region of the outlet.

This procedure according to the invention therefore ensures an effective vibration and sound decoupling between the (vibration-generating) fan unit and the cover unit (which is necessarily rigid for stiffening purposes), wherein the present invention in the preferred embodiment, namely without the provision of any further connecting elements outside the cushion material itself, synergistically uses the cushion with doubly advantageous functionality: firstly, the (foam) material (which is itself substantially air-impermeable) of the cushion ensures that cover unit, on the one hand, and fan unit, on the other hand, are sufficiently stably secured in fixed relative positions at a distance from each other, wherein, according to a development and preferably, the cover is placed on or is inserted in the outlet-side end of the cushion, while the fan unit is suitably provided over the further course of the air flow duct, preferably in a central installation position and therefore spaced apart both from the outlet side and from an opposite opening side of the air flow duct. The invention equally appropriates the advantageous vibration damping properties of the foam material which can be used advantageously and according to a development for realizing the cushion and which therefore furthermore effectively insulates and damps the potentially disadvantageous vibration excitation effects, vibration effects and structure borne sound effects.

An additional advantageous effect is that further fastener assemblies are customarily not required, in particular whenever the fan unit can be connected in a suitable manner on the edge side or casing side of the fan housing, furthermore preferably by means of fastening or anchoring means which can be suitably provided there, to the surrounding foam material of the air flow duct in a simple and positionally reliable manner while, for example, the cover unit can be placed as an assembly and simply be placed onto or inserted into the air outlet; in particular if, within the scope of a further systemic realization of the vehicle seat, assemblies are then covered by an applied, air-conducting top layer, the cover unit can therefore also be secured in a simple and operationally secure manner.

As a result, the present invention therefore makes it possible in a surprisingly simple manner to overcome the disadvantages identified in the prior art, by, namely, the material-induced functionality of the cushion being used both for the securing according to the invention, in a manner decoupled and spaced apart, of the assembly cover unit and fan unit, and also this material with its damping properties achieves the desired vibration and structure borne sound decoupling.

Depending on the operating conditions and geometrical requirements of the cushion and of the vehicle seat which can be realized therewith, it is advantageous according to a development to design the distance according to the invention between the cover unit and the fan unit, according to a development, to minimum distances, wherein a minimum distance, measured as approx. 20% to 30% of a (radially measured) diameter of the fan rotor, has turned out to be an advantageous lower limit according to a development; in the additional development, said lower limit can also be at least 60% or even at least 100% of the fan diameter.

Against the background of a possible use of existing (foam) cushion configurations with apertures already provided in order to realize the air flow duct for the purpose of retrofitting, it is preferred according to a development and included by the invention to configure the air flow duct so as to pass through the cushion in a transverse direction with respect to the seat or back contact surface such that an air flow direction, as axial direction through the air flow duct, furthermore runs perpendicularly to the seat and/or back contact surface.

In order to be able to optimize the geometrical proportions on or in the cushion and to be able to suitably adapt same to conditions in the flow and air conveying behavior of the fan unit, it may be advantageous and preferred, according to a further configuration of the invention to be provided in addition or alternatively to the abovementioned variants, to expand the air flow duct in diameter on the end side in the direction of the air outlet, wherein this can take place either conically, in a stepped manner or with a longitudinal curved form; in addition to influencing the flow space, reception of the cover unit, which is to be inserted on the end side, can therefore also be optimized.

While, according to the invention, the components of cushion, cover unit and fan unit that are critical to the invention are positioned and secured relative to one another, it is nevertheless advantageous and preferred, in a development, by means of application of a layer of an air-permeable material as the air-conducting layer and a top layer thereon in order to produce the actual seat surface (suitably and otherwise known from textile material, from leather or plastics material in each case with suitable apertures, for example perforations), to manage the integration into a vehicle seat which likewise lies within the scope of the invention and advantageously is claimed, in a development, as a direct realization of the invention.

The extensive covering of the cushion, that is provided according to a development, with the air-permeable material should be understood here as a continuous, uninterrupted covering of at least 50% of the seat and/or back contact surface, preferably at least 80%, furthermore preferably of at least 60%, furthermore preferably of at least 75% of the seat and/or back contact surface of the cushion.

It is possible, again in a development, to provide, under the top layer and in a manner otherwise known, seat heating in the form of an arrangement, to be suitably applied as a layer, of heating wires to be heated electrically, and therefore the device according to the invention, in addition to the ventilation, can also be supplemented by an electric heat-generating functionality.

Again as a variant, a heating device which, for example, heats the air which is sucked up or flows in prior to the discharge of the air to the seat and/or back contact surface can also be suitably assigned to the air flow duct, and therefore, for example, the intended comfort-increasing ventilation effect can be effectively extended to particularly cold operating or environmental conditions of a vehicle ventilated in this manner.

The terminology used within the scope of the present invention should be understood here as meaning that reverse functionalities are also intended to be covered by the invention: the terminology according to the main claim is thus based on a preferred, but not exclusive manner of operation of the fan unit as a fan which discharges sucked-up air through the outlet according to the invention into the seat and/or back contact surface. Equally, however, the invention also includes a reverse operating mode, in which a (correspondingly oppositely driven) fan rotor sucks up air through the air outlet in the seat and/or back contact surface and then suitably discharges same at the opposite end of the air flow duct into the vehicle interior. In a manner obvious to a person skilled in the art, the ventilation purpose of the vehicle seat is also achieved by such a mode.

BRIEF DESCRIPTION OF THE DRAWINGS

Further advantages, features and details of the invention emerge from the description below of preferred exemplary embodiments and with reference to the drawings, in which.

DETAILED DESCRIPTION

Figure 1:
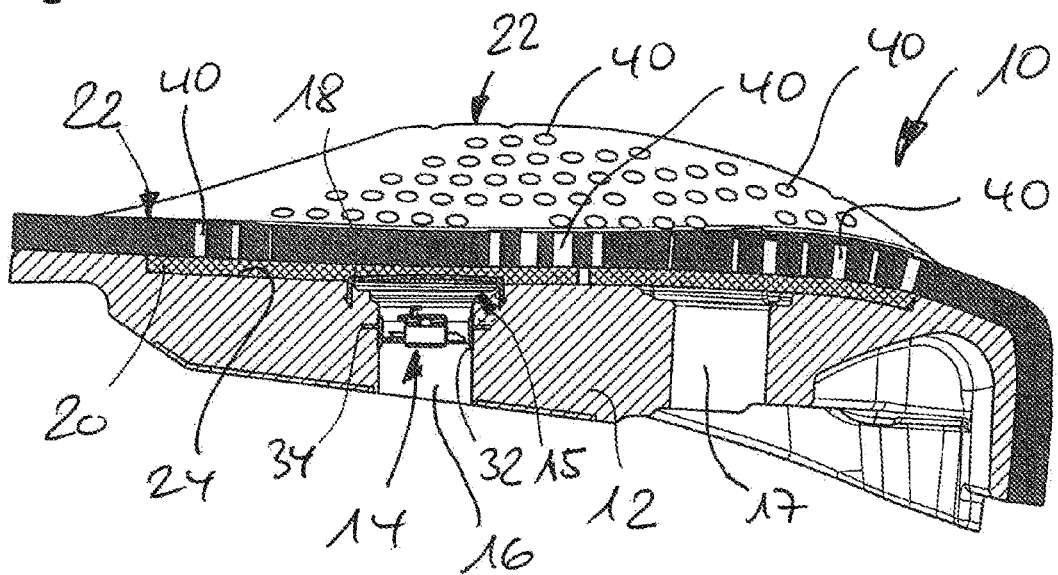
FIG. 1 shows a lateral sectional view of the device for ventilating a vehicle seat according to a first exemplary embodiment of the invention with additional layers.

FIG. 1 illustrates, in the lateral sectional view, a seat region 10 of a vehicle seat, in which the ventilation device of the exemplary embodiment shown, having a cushion 12, a fan unit 14 held therein and also a cover unit 18 covering an air flow duct 16 in the cushion 12 on the outlet side, are covered by a layer 20 of an air-permeable material as a horizontal air guide which, in turn, on the top side has a top covering 22 composed of a seat leather material on which a user (not shown in the figures) then sits.

Put more precisely, as shown in the illustration in FIG. 1, the cushion 12 has a plurality of air flow ducts (typically four, wherein the sectional view shows two in the form of the ducts 16, 17) which, extending vertically in the plane of the figure, pass through the foam material of the cushion 12 and to this extent run with their flow direction (likewise running vertically) perpendicularly to the seat contact surface 24 defined by the surface of the cushion 12.

Figure 2:
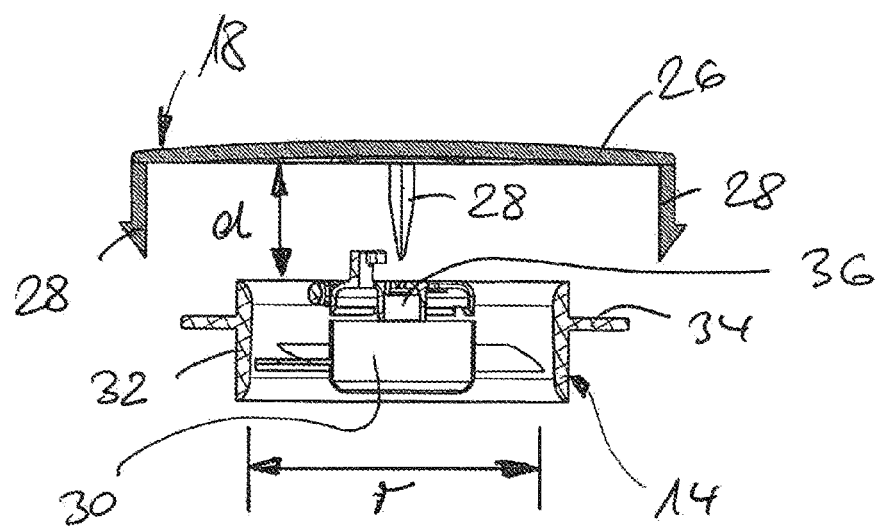
FIG. 2 shows a schematic view for clarifying the spacing according to the invention between the cover unit and the fan unit (without an illustrated cushion) in the exemplary embodiment of FIG. 1.

As can also be seen in the sectional view of FIG. 1, the ducts 16, 17 which are designed as apertures in the foam material of the cushion 12 and have a substantially cylindrical inner contour are illustrated on the outlet side, i.e. in the direction of the air-permeable layer 20 resting thereon, with a cross-sectional and opening width widening in a stepped manner, wherein the air outlet formed in such a manner is then covered in the manner shown by the cover unit 18 which, compare the detailed view of FIG. 2, is realized as an integral injection molded part from a plastics material and has a lattice which is encompassed by a frame and furthermore runs horizontally in order to permit passage, with little flow resistance, of the air conveyed out of the (respective) air outlet. As FIG. 2 clarifies, hook portions 28 which are integrally formed on the edge side of the frame portion 26 of the cover unit 18 are provided which are designed in the manner shown in FIG. 1 for edge-side insertion and anchoring in the foam material by means of an end-side barb. Reference sign 15 clarifies the stepped expansion, which is visible toward the outlet opening, of the duct 16.

As the figures clarify and in particular the schematic illustration of FIG. 2 illustrates, no connecting elements apart from the foam material of the cushion 12 are provided for the vibration, sound and movement damping (and therefore decoupling) between the assemblies 18 and 14; on the contrary, said assemblies, symbolized by the distance arrow d in FIG. 2, are spaced apart from each other by a distance (running along the direction of extent of the associated flow duct, not shown in FIG. 2) which, in the exemplary embodiment shown, makes up somewhat less than 50% of the radial diameter r of a fan wheel 30 of the fan unit 14, which is realized as an axial fan. As the detailed view of FIG. 2 reveals in this regard, the fan wheel 30 moves in a fan housing 32 which surrounds the latter cylindrically and which, for fastening purposes, has a radially outwardly extending annular flange 34 fitted integrally. Control electronics (otherwise customary) are shown, symbolized by the reference sign 36, in the central axis region of the fan wheel 30.

FIG. 1 clarifies in turn how, at the distance d, the assemblies are anchored in the foam material 12 without special connecting elements or similar mechanical additional assemblies being required in the exemplary embodiment shown here.

As FIG. 1 clarifies, the top covering 22, composed of otherwise air-impermeable seat leather in the exemplary embodiment illustrated, has, in order to permit the passage of air to the seated user, a plurality of perforation-like apertures 40 which expose the flow path through the air-permeable (horizontally running) layer 24 outward to the user. In the exemplary embodiment shown and upon corresponding activation of the fan unit 14, air is correspondingly sucked in from below (from the interior of the vehicle) into the air flow ducts 16, 17 and, by action of the rotors 30, can then exit through the respective outlet of the ducts 16, 17, the respectively associated cover unit 18, the common air-permeable layer 24 and respective apertures 40, which act in the manner of nozzles, in the top covering 22.

It is possible according to the invention to operate the respective fan units at high fan rotational speeds without having to be concerned about potentially comfort—and function—damaging vibrations since, in the manner shown, the foam material of the cushion 12 not only securely anchors the functional components involved in their spaced-apart relative position with respect to one another, but also, by means of damping, prevents any perceptible vibration, movement or sound transmission.

The present invention is not restricted to the exemplary embodiment shown. The arrangement of FIG. 1, for example, can thus equally be transferred to a back cushion, in the same manner as, for example, yet further assemblies, for example heating units, can be integrated—either as an additional layer in the layer sequence, and in addition or alternatively as heating means which are introduced into the air ducts or are mounted upstream thereof, and it is equally included by the invention to design a transport of air, which is directed upward with respect to the plane of FIG. 1, in a reverse manner by means of suitable inverse activation of the fan units, in such a manner that additional air is sucked up through the openings in the top covering 22, and therefore through the (respective) cover unit 18, and is discharged on the bottom side from the ducts 14, 14a.

The invention claimed is:

1. A device for ventilating a vehicle seat, comprising
a cushion (12) which is elastic with respect to user contact, is configured to form a seat and/or back contact surface (24) and has an air flow duct (16, 17) forming an air outlet (15) in the direction of the seat and/or back contact surface,
an air-permeable, rigid cover unit (18) which is designed for at least partially covering the air outlet,
and a fan unit (14) which is assigned to the air flow duct, has a fan rotor (30) driven by an electric motor and also a fan housing (32) radially surrounding the fan rotor at least in sections,
wherein
the cover unit and the fan unit are spaced apart (d) from each other along the air flow duct without a direct connection of portions of the cover unit and of the fan unit, and
wherein a connection between the cover unit and the fan unit is realized only by a rubber-elastic material of the cushion (12) and comprises a radially outwardly extending flange (34) fixed in the material of the cushion (12).

2. The device as claimed in claim 1, wherein the cover unit rests on the seat and/or back contact surface or is inserted on the outlet side of the air flow duct into an opening and/or end portion of the cushion.

3. The device as claimed in claim 1, wherein the fan unit is inserted into the air flow duct in such a manner that the material of the cushion (12) acts in a securing manner on the edge side or casing side of the fan housing (32, 34).

4. The device as claimed in claim 1, wherein a distance (d), as measured along the direction of the air flow duct, between an outlet-side end of the fan housing and a portion of the cover unit that covers the air outlet is at least 20% of the diameter (r) of the fan rotor (30).

5. The device as claimed in claim 1, wherein the air flow duct passes through the cushion (12) in a transverse direction with respect to the seat and/or back contact surface.

6. The device as claimed in claim 1, wherein a cross section of the air flow duct is widened from a position calculated for holding the fan unit in the direction of the air outlet (15).

7. The device as claimed in claim 1, wherein a plurality of air flow ducts (14, 14a) with a respectively assigned cover unit and fan unit are formed in the cushion.

8. The device as claimed in claim 1, wherein the seat and/or back contact surface is covered over a large area, jointly covering a plurality of air outlets of mutually adjacent air flow ducts, with a layer (20) of an air-permeable material, said layer having a smaller material thickness than the cushion.

9. The device as claimed in claim 1, wherein the cover unit is connected via connecting portions to the fan unit and in a manner spaced apart therefrom, said connecting portions being configured as a web and realized from an elastic material which differs from the fan housing and from the cover unit, and/or, with respect to a circumference of the flow duct, covering less than 10%, of the circumference.

10. A vehicle seat having the ventilation device as claimed in claim 1, a layer (20) of an air-permeable material applied to the seat and/or back contact surface, and also a top layer (22) which is air-permeable at least in sections, and is composed of a textile material, a plastics material and/or a leather material.

11. The vehicle seat as claimed in claim 10, further comprising flat electric heating means applied to the layer of air-permeable material.

12. The device as claimed in claim 1, wherein the rigid cover unit (18) is configured in the manner of a lattice.

13. The device as claimed in claim 1, wherein the cover unit and the fan unit are fastened to or in the cushion.

14. The device as claimed in claim 1, wherein the connection is a mechanical connection.

15. The device as claimed in claim 1, wherein the rubber elastic material is configured as a foam material.

16. The device as claimed in claim 4, wherein the distance (d) is at least 50% of the diameter (r).

17. The device as claimed in claim 1, wherein the distance (d) is at least 100% of the diameter (r).

18. The device as claimed in claim 9, wherein said connecting portions cover less than 5% of the circumference.

19. The device as claimed in claim 9, wherein said connecting portions cover less than 2% of the circumference.

20. The vehicle seat as claimed in claim 10, wherein the top layer (22) is perforated.

* * * * *